Patented Jan. 15, 1929.

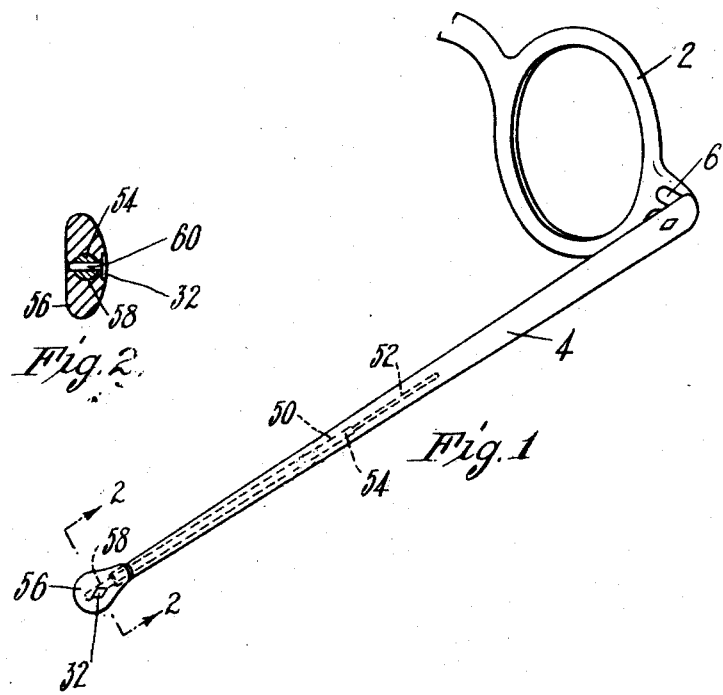

1,699,081

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Original application filed June 13, 1921, Serial No. 477,146. Divided and this application filed May 15, 1922, Serial No. 560,952. Renewed October 22, 1925.

The present invention relates to ophthalmic mountings or eyeglasses, and more particularly to spectacle temples.

The object of the invention is to provide an improved reinforced temple that shall be adjustable to any desired shape, and that shall be adapted to retain that shape after adjustment.

The present application is a division of application Serial No. 477,146, filed June 13, 1921, which matured, on March 16, 1926, into Patent No. 1,576,868, and is filed in response to a requirement by the Patent Office for division.

In the accompanying drawings Fig. 1 is a view of a spectacle temple constructed according to an embodiment of the present invention, and shown hinged to a lens frame; and Fig. 2 is a section taken upon the line 2—2 of Fig. 1, looking in the direction of the arrows.

The temple 4 of the present invention is for the most part, constituted of plastic, non-metallic material, like celluloid, zylonite or other composition. Its outer surface tapers from its larger or forward end towards its rear end of smaller diameter and its sides are flattened. It is shown pivotally connected or secured at its forward or front end to a lens-holding, eyeglass frame 2 by a hinge 6. Spectacle or eyeglass temple bars of this type are in common use, but are comparatively heavy and clumsy, and rather thick at the rear ends to provide the necessary rigidity for holding the temple in place behind the ear. This is particularly true of skull temples, for the rear ends of skull temples are designed to engage, and hold firmly against, the skull, and this they can not do unless the nonmetallic material is thick and of substantial proportions.

According to the present invention, however, the thickness of the rear end of the temple may be made small compared to that of the forward end, the required rigidity being attained by the use of a reinforcing or strengthening member 54, shown as a flexible metal wire or core. To this end, the temple is longitudinally bored or recessed at 50 from the rear end towards the forward end. The forward portion 52 of the bore is of reduced dimension. The reenforcing metal wire 54 is shaped to conform to the bore and is substantially enclosed therein, so as to extend forward in the rear portion of the temple from substantially the rear end thereof. The temple has thus the appearance of the non-metallic material, but it has the property of metal in that it may be bent or curved into any desired shape, such as the ear hook or skull shape, so as to extend over the ear of the wearer, and, unlike non-metallic temples, which have a tendency to warp, it will maintain that shape. A single temple may thus be kept in stock for a variety of purposes, and the stock kept on hand in the optician's shop may therefore be materially reduced. The wire 54 is longer than the bore 50, so that its rear portion projects or extends rearward through the non-metallic material and beyond the rear end of the temple member 4. The wire 54 is not, therefore, completely enclosed in the bore 50, but it is substantially and functionally so. A separate, enlarged, skull-gripping end piece or knob 56 is mounted over the projecting free end or extension of the reenforcing wire and the rear end of the temple member 4 to engage the wearer's skull.

The knob 56 is also constituted of non-metallic material and is provided with an opening or socket 58 into which the end of the metal wire 54 extends or is fitted. A rivet or screw 60 extends through alined bores in the end of the wire 54 and the knob 56 for securing the knob to the wire, thus effecting attachment of the knob to the free end of the rear portion of the temple. The rivet or screw 60 is provided with an irregular head 32 that is sunk flush into the non-metallic material of the knob 56 to prevent accidental turning of the rivet or screw.

The wire core 54 cooperates with the non-metallic material of the temple and the knob to strengthen the temple at the joint between them.

A temple constructed according to the present invention, though very thin at the rear end, will maintain any form into which it may be shaped, and will be strong enough, in the case of skull temples, to press firmly in, and to hold against, the skull. The forward portion of the temple is shown unreinforced, as it is constituted of sufficiently thick nonmetallic material to have substantial rigidity without reinforcement.

Modifications will readily suggest themselves to persons skilled in the art, and all such are considered to be within the spirit and scope of the present invention, as defined in the appended claims.

What is claimed as new is:—

1. A spectacle temple comprising a non-metallic member adapted to be hinged at the forward end and longitudinally bored from the rear end towards the forward end, and a reenforcing member enclosed within the bore.

2. A spectacle temple comprising a non-metallic member adapted to be hinged at the forward end and longitudinally bored from the rear end towards the forward end, the forward end of the bore being of reduced dimension, and a reenforcing metal member shaped to conform to and enclosed within the bore.

3. A spectacle temple comprising a non-metallic member adapted to be hinged at the forward end and longitudinally bored from the rear end towards the forward end, a metal reenforcing member enclosed within the bore having a portion projecting rearward beyond the rear end of the non-metallic member, and a knob mounted over the projecting end of the reenforcing member and the rear end of the non-metallic member.

4. A spectacle temple comprising a metal member having a bore, a knob constituted of non-metallic material having an opening whereby it may be mounted over the metal member and having a bore alining with the first-named bore, and a rivet mounted in the alined bores for securing the knob to the metal member and having a head of irregular shape flush with a face of the knob.

5. A spectacle temple comprising a non-metallic member adapted to be hinged at the forward end and longitudinally bored from the rear end towards the forward end, a metal reenforcing member enclosed within the bore having a bored portion projecting rearward beyond the rear end of the non-metallic member, a knob constituted of non-metallic material mounted over the projecting end of the reenforcing member and the rear end of the element having a bore alining with the first-named bore, and a rivet mounted in the alined bores for securing the knob to the metal member having a head of irregular shape flush with a face of the knob.

6. A spectacle temple comprising non-metallic material adapted to be hinged at the forward end and having therein a metal member provided with an end portion projecting rearward beyond the rear end of the non-metallic material, and a non-metallic knob mounted over the rearward projecting end portion of the metal member, the construction and arrangement being such that the metal member is concealed by the non-metallic material and the knob.

7. A spectacle temple comprising non-metallic material adapted to be hinged at the forward end and provided with a bore, a metal member secured in the bore and having a rear end portion projecting rearward beyond the rear end of the non-metallic material, and a non-metallic knob mounted over the projecting end portion of the metal member, the construction and arrangement being such that the metal member is concealed by the non-metallic material and the knob.

8. A spectacle temple comprising non-metallic material adapted to be hinged at the forward end, a metal member mounted within the non-metallic material, and a knob mounted over the rear ends of the metal member and the non-metallic material.

9. A spectacle temple comprising a non-metallic member adapted to be hinged at the forward end and having a rear loop, a metal reinforcing member in the loop, and a non-metallic knob mounted over the rear end of the loop.

10. A spectacle temple comprising a non-metallic member adapted to be hinged at the forward end, a metal member mounted within the non-metallic member, and a non-metallic knob mounted over the rear ends of the metal member and the non-metallic member.

11. A spectacle temple comprising a non-metallic member adapted to be hinged at the forward end and provided with a bore, a metal member having a forward portion in the bore and a rear end portion projecting rearward beyond the rear end of the non-metallic member, and a non-metallic knob mounted over the rearward projecting end portion of the metal member.

12. A spectacle temple comprising a non-metallic member adapted to be hinged at the forward end, a metallic member secured to the non-metallic member and having an end portion projecting rearward beyond the rear end of the non-metallic member, and a non-metallic knob mounted over the rearward projecting end portion of the metal member.

13. A spectacle temple comprising a non-metallic member adapted to be hinged at the forward end and longitudinally bored from the rear end towards the forward end, a metal member mounted in the bore and projecting rearward beyond the rear end of the non-metallic member, and a knob mounted over the rear ends of the metal member and the non-metallic member.

14. A spectacle temple comprising a non-metallic member adapted to be hinged at the forward end and longitudinally bored from the rear end towards the forward end, a metal member mounted in the bore and having a portion projecting rearward beyond the rear end of the non-metallic member, and a knob mounted over the projecting end of the metal member and the rear end of the non-metallic member.

15. A spectacle temple comprising a non-metallic member adapted to be hinged at the forward end and longitudinally bored from the rear end towards the forward end, a metal member mounted in the bore having a bored portion projecting rearward beyond the rear end of the non-metallic member, a knob constituted of non-metallic material mounted over the projecting end of the metal member and the rear end of the non-metallic member having a bore alining with the first-named bore, and a rivet mounted in the alined bores for securing the knob to the metal member having a head of irregular shape flush with a face of the knob.

16. A spectacle temple comprising a non-metallic member bored at its rear end and adapted to be hinged at the forward end, a reenforcing metal member mounted in the bore having a portion projecting rearward beyond the rear end of the member, and a non-metallic member mounted over the projecting portion of the reenforcing member.

17. A spectacle temple comprising a non-metallic member adapted to be hinged at the forward end and the rear portion of which is curved to extend over the ear of the wearer, and a reinforcing member enclosed within the rear portion of the non-metallic member and extending forward from substantially the rear end thereof, the portion of the non-metallic member that extends rearward from the forward end being unreinforced but being constituted of sufficiently thick non-metallic material to have substantial rigidity without reinforcement.

18. A spectacle temple comprising non-metallic material adapted to be hinged at the forward end and the rear portion of which is curved to extend over the ear of the wearer, a separate enlarged skull-gripping end piece attached to the free end of the rear portion, and a strengthening wire core mounted in the non-metallic material and extending through the non-metallic material into the end piece, the wire core cooperating with the non-metallic material and the end piece to strengthen the temple at the joint between the non-metallic material and the end piece.

19. A spectacle temple comprising non-metallic material adapted to be hinged at the forward end and the rear portion of which is curved to extend over the ear of the wearer and provided at its rear extremity with an enlarged skull-engaging end portion, and a wire core in the non-metallic material and extending into the enlarged end portion and cooperating with the non-metallic material and the end portion to strengthen the temple at the joint between the non-metallic material and the end portion.

20. A spectacle temple comprising non-metallic material adapted to be hinged at the forward end and the rear portion of which is curved to extend over the ear of the wearer and provided at its rear extremity with an enlarged separate skull-engaging end portion having a socket into which the said extremity extends, and a wire core in the non-metallic material extending into the enlarged end portion and cooperating with the non-metallic material and the end portion to strengthen the temple at the joint between the non-metallic material and the end portion.

21. A spectacle temple comprising a member of non-metallic material having a forward comparatively thick portion and a comparatively thin rear portion, the temple being adapted to be hinged at the forward end and the rear portion of the temple being curved to extend over the ear of the wearer, and an enlarged separate end-piece member connected to the free end of the rear portion, one of said members having a socket and the other member being fitted in the socket.

22. A non-metallic spectacle temple member adapted to be hinged at the forward end and the rear portion of which is curved to extend over the ear of the wearer, an enlarged separate endpiece member connected to the free end of the temple member, one of said members having a socket and the other member being fitted in the socket, and a strengthening wire core in the temple member extending into the endpiece member, the wire core cooperating with the temple member and the end-piece member to strengthen the temple at the joint between the members.

In testimony whereof, we have hereunto subscribed our names this 11th day of May, 1922.

F. A. STEVENS.
JAMES W. WELSH.